March 9, 1926.
C. F. BULLOCK
U TUBE MANOMETER
Filed Nov. 8, 1924
1,576,087
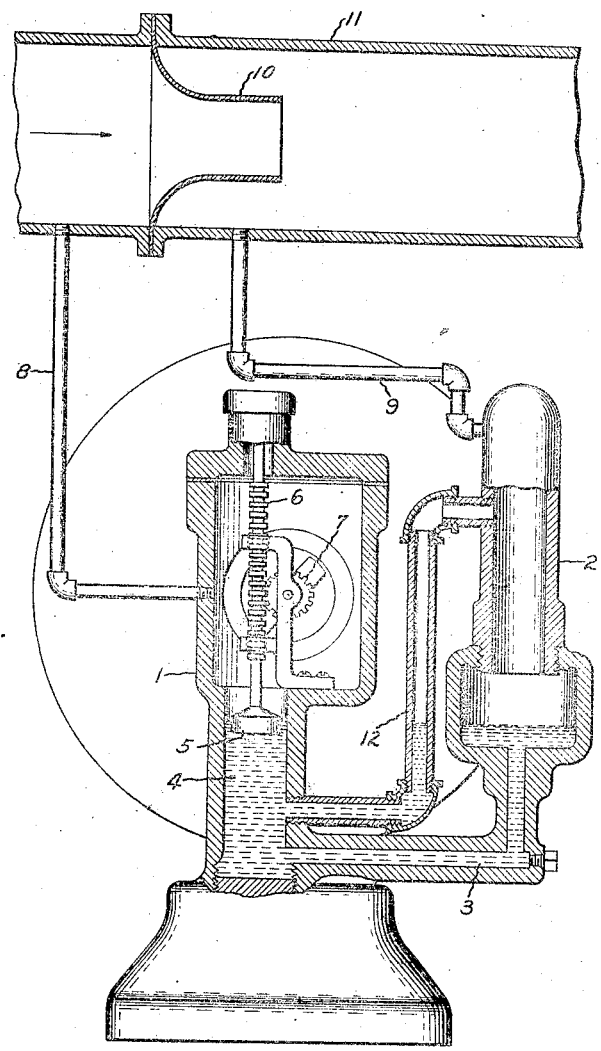
Inventor:
Charles F. Bullock
by *Alexander F. Lunt*
His Attorney.

Patented Mar. 9, 1926.

1,576,087

UNITED STATES PATENT OFFICE.

CHARLES F. BULLOCK, OF SCHENECTADY, NEW YORK, ASSIGNOR TO GENERAL ELECTRIC COMPANY, A CORPORATION OF NEW YORK.

U-TUBE MANOMETER.

Application filed November 8, 1924. Serial No. 748,779.

*To all whom it may concern:*

Be it known that I, CHARLES F. BULLOCK, a citizen of the United States, residing at Schenectady, in the county of Schenectady, State of New York, have invented certain new and useful Improvements in U-Tube Manometers, of which the following is a specification.

The present invention relates to manometers of the U-tube type such as are used in connection with flow meters for example, for measuring the pressure difference set up by a pressure difference creating device. Such instruments comprise a U-tube containing an indicating liquid such as mercury for example, the pressure difference being measured by applying the two pressures to the two legs of the U-tube and noting the deflection of the liquid.

In connection with the practical use of U-tube instruments there is danger that abnormal conditions may occur wherein the instrument may be subjected to pressures of such high value as to force the indicating liquid entirely out of the U-tube, and the object of my invention is to provide an improved means which serves to prevent such a thing from happening.

For a consideration of what I believe to be novel and my invention attention is directed to the accompanying description and the claims appended thereto.

In the drawing, the figure is a somewhat diagrammatic view of a U-tube manometer embodying my invention.

Referring to the drawing, 1 indicates the leading leg of the instrument, and 2 indicates the trailing leg, the two legs being connected by the horizontal passage 3, thereby forming a U-tube. In the U-tube is an indicating liquid 4 and riding on it in the leading leg 1 is a float 5 which actuates a suitable indicating mechanism through a rack 6 and pinion 7. Connected to leading leg 1 is a leading pressure pipe 8 and connected to trailing leg 2 is a trailing pressure pipe 9. In the present instance pipes 8 and 9 are shown as being connected to a pressure difference creating device 10 located in a conduit 11, the device being in the form of a flow nozzle. The structure so far described is that of a known type of flow meter (see for example the patent to Mapelsden, 1,481,921, dated January 29— 1924) and is to be taken as typical of any U-tube manometer.

The operation of such an instrument is well understood, the differential pressure applied to the two legs of the U-tube causing the indicating liquid to deflect, thereby operating the indicating means connected to pinion 7.

Now it will be clear that if a pressure of abnormal value were applied to the leading leg 1 of the instrument through pipe 8 it might force the indicating liquid out through pipe 9 and over into conduit 11 whereby the liquid would be lost and the flow meter put out of service, and it is the object of my invention to provide means which will serve to prevent an occurrence of this character.

According to my invention, I provide in connection with the flow meter a bypass pipe or conduit which extends from a point above the highest deflection level of the liquid in the trailing leg of the U-tube to a point in the leading leg of the U-tube. The passage through this bypass pipe or conduit is normally closed, but the arrangement is such that in case of over-deflection of the liquid such passage will be opened automatically. The bypass pipe or conduit then serves to connect together the two legs of the U-tube above the levels of the liquid in them, thus providing a short-circuiting passage through which the pressure from the leading leg may escape directly to the trailing leg. This serves to tend to equalize the pressures in the two legs of the U-tube above the levels of the liquid therein and prevents further deflection of the liquid.

According to the preferred form of my invention, I provide a bypass pipe or conduit 12 which extends from a point in leading leg 1 below the lowest normal deflection level to a point in the trailing leg well above the highest normal deflection level. This bypass pipe forms in substance a second trailing leg for the U-tube in parallel with leg 2, the liquid rising and falling in it along with the liquid in leg 2. The passage through it is normally closed, being sealed by the liquid in leading leg 1. However, in case of over deflection of the liquid in leg 1 it will be seen that as soon as the liquid drops below the lower end of pipe 12, the pipe serves to connect the two legs of the U-tube together above the liquid levels therein. As a result the pressure will blow the liquid in pipe 12 over into leg 2 and the pressure in the two legs will then tend to become equalized and further deflection of the liquid prevented. This will prevent the possibility of blowing the liquid out of the U-tube. In this connection, it will be noted that the capacity of trailing leg 2 below the point of connection of conduit 12 to it is large enough to hold all the liquid in the U-tube. As a result no liquid can be blown through pipe 9. As soon as normal pressure conditions are restored, the liquid will automatically again seal bypass pipe 12 so that the meter will go back into service.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent in the United States is:—

1. The combination with an instrument comprising a U-tube and indicating liquid therein, of means controlled by the level of the liquid in the U-tube for automatically placing the two legs of the U-tube in communication with each other above the levels of the liquid therein when the liquid deflection from the leading leg of the U-tube to the trailing leg of the U-tube exceeds a predetermined amount.

2. The combination with an instrument comprising a U-tube and indicating liquid therein, of a bypass conduit which connects the trailing leg of the U-tube at a point above the highest normal deflection level therein to the leading leg, the passage through said conduit being normally closed, and means controlled by the level of the liquid in the U-tube for opening said bypass when the liquid deflection exceeds a predetermined amount.

3. The combination with an instrument comprising a U-tube and indicating liquid therein, of a bypass conduit which extends from a point adjacent to the lower end of the leading leg of the U-tube to a point adjacent to the upper end of the trailing leg of the U-tube.

In witness whereof, I have hereunto set my hand this 7th day of November, 1924.

CHARLES F. BULLOCK.